United States Patent

[11] 3,582,745

| | | |
|---|---|---|
| [72] | Inventors | Yasukata Eguchi;<br>Kenji Kato, both of Tokyo, Japan |
| [21] | Appl. No. | 684,909 |
| [22] | Filed | Nov. 20, 1967 |
| [45] | Patented | June 1, 1971 |
| [73] | Assignee | Janome Sewing Machine Co., Ltd.<br>Tokyo, Japan |

[54] SPEED CONTROL CIRCUIT MOTOR
3 Claims, 5 Drawing Figs.

[52] U.S. Cl. ..................................................... 318/331,
318/341
[51] Int. Cl. .................................................... H02p 5/16
[50] Field of Search .......................................... 318/45 DT;
321/45DT

[56] References Cited
UNITED STATES PATENTS
3,293,523  12/1966  Hutson .......................... 321/45

*Primary Examiner*—Oris L. Rader
*Assistant Examiner*—Thomas Langer
*Attorney*—Linton and Linton ABSTRACT: This invention is concerned with a speed control for an electric motor which has been devised after noticing that the motor current increases or decreases approximately in proportion to the size of the load thereon and which control consists of a series circuit composed of an alternating current supply source, a motor and a symmetrical semiconductor switching element presenting low impedance by means of a trigger pulse, a phase adjusting circuit providing a trigger pulse on this circuit, and an ignition circuit, and a primary winding of a feedback transformer connected in series between said current supply source and the motor, and a secondary winding connected between said phase adjusting circuit and the supply source, taking polarity into consideration, thus the motor current flowing through said switching element is impressed to said primary winding, and this current is transformed as voltage to this secondary winding, and a polarity of this transformed voltage is fed back as a voltage of a reversed polarity to the polarity of the voltage to be supplied to the phase adjusting circuit from the current supply source to sensitively respond to the fluctuation of the load so that the ignition phase of said switching element is controlled automatically.

PATENTED JUN 1 1971 3,582,745

SPEED CONTROL CIRCUIT MOTOR

This invention relates to a speed control circuit of motor, using a symmetrical semiconductor element. The object of the present invention is to provide a circuit which sensitively responds to the fluctuation of a load so as to adjust the ignition phase angle of an element automatically, and thereby maintains the speed of the motor at a set speed at all times.

Figure 1:
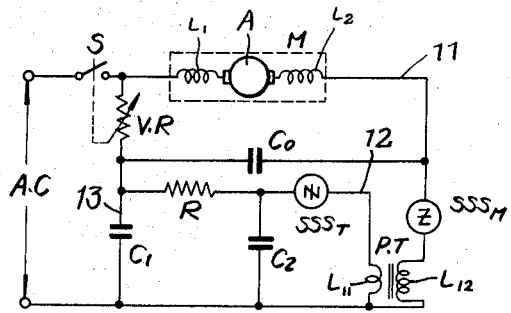
FIG. 1 is a prior speed control circuit diagram using a symmetrical semiconductor element.
Figure 2:
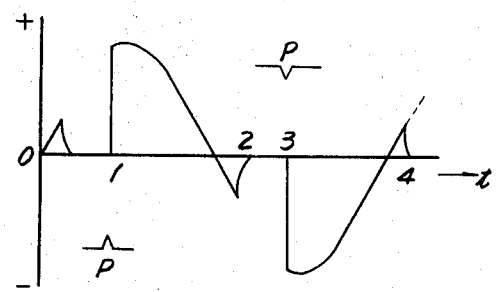
FIG. 2 shows wave shapes of the voltage controlled by a circuit as shown in FIG. 1.

FIG. 1 shows an example of a prior speed control circuit using a semiconductor element, which is provided with an motor M connected to a alternate current power source AC a primary coil $L_{11}$ to a main circuit having a main circuit semiconductor element $SSS_M$ and a secondary coil $L_{12}$ of pulse transformer P.T., a pulse generating circuit 12 having a semiconductor element for ignition $SSS_T$ and a condenser $C_2$, said condenser $C_2$, a variable resistor V.R. and a phase adjusting circuit 13 having a condenser $C_1$ and a resistance R. This is a speed control circuit of motor M using a symmetrical semiconductor element. As publicly known, such a control circuit using a symmetrical semiconductor element controls the speed of a motor by controlling the terminal voltage of motor M. The method of controlling the voltage resides in conducting current to the motor from any of the plus and minus half cycles of current voltage to the end of a corresponding half cycle by the switching action of semiconductor element having symmetrical characteristic and controlling the voltage by adjusting the phase of the flowing current. This method is generally called a phase control of alternate current voltage. Namely by changing the resistance value of variable resistor, the signal phase of a switch circuit comprising ignition semiconductor element $SSS_T$, pulse trans P.T., condenser $C_1$, $C_2$ and resistance R is varied in various ways. Thereby adjusting the continuity angle of the main circuit semiconductor element so as to control the speed of motor M. Further in the figure, condenser $C_0$ serves for preventing trouble of high frequency receipt and switch S operates in association with variable resistor V.R. and opens when motor M is not driven. The wave-shape of the thus controlled terminal voltage of motor M is shown in FIG. 2 in which P denotes a trigger pulse. Accordingly, to $t$, main circuit semiconductor element $SSS_M$ becomes continuity in phases 1 and 3, and discontinuity in phases 2 and 4. On the other hand, in the case of the prior circuit as in FIG. 1, the continuity phase set by adjustment of variable resistor V.R. does not vary, so far as resistance value of variable resistor V.R. is not changed. However, when the load of motor M increases, the discontinuous phase in FIG. 2 will lag due to the load fluctuation of the motor, and in effect the continuous phase will lag. With such a phenomenon the applied voltage will decrease and accordingly the rotation speed of motor will be reduced. When the load increases so much so as not to be able to drive the motor by a set voltage, the motor stops. On the contrary when the load decreases, speed of the motor increases unnecessarily high. Accordingly when such a circuit is used as load for instance for a electric sewing machine or other working machinery and implements, a low speed starting and a stabilized low speed of rotation have not been obtained as required especially by sewing machine.

The present invention has been devised to remedy the above disadvantages of the prior art. The fundamental object of the present invention is to obtain a circuit which automatically advances continuity phase of wave-shape of voltage of FIG. 2 controlled by the control circuit using a symmetrical semiconductor element, namely phases 1 and 3 of the same figure in response to the fluctuation of load, so as to increase the terminal voltage of the motor, for instance in case the load of the motor increases, and automatically delays said phases so as to lower the voltage when the load of the motor decreases. In order to realize such a process, it is essential to follow up the size of fluctuation of voltage from the beginning of the fluctuation at all times from moment to moment and to move the phase proportionally to the size. To this end the present invention is so constructed as to detect the fluctuation of the load electrically and simultaneously feed it back to a phase control circuit.

Figure 3:
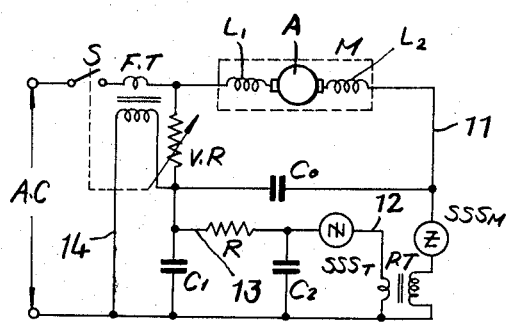
FIG. 3 and FIG. 4 show a circuit diagram of the speed control circuit of the present invention having a function of responding to the change of the current of a motor, thereby stabilizing the speed of the motor automatically.

An explanation will be given to an embodiment of the present invention show in FIG. 3 and the following. First of all, the subject matter of FIG. 3 is a prior control circuit exemplified in FIG. 1 applied with the idea of the present invention. Namely main circuit 11, pulse generating circuit 12 and phase adjusting circuit 13 are similar to those of FIG. 1. Between the terminals of condenser $C_1$ in said phase adjusting circuit 13 a feedback signal circuit 14 forming secondary side of transformer F.T. is connected and the primary side of said transformer F.T. is connected to the main circuit of the motor in series. In order to change the continuity phase of the main shaft semiconductor element $SSS_M$ it is required to change the ignition phase of the ignition semiconductor element $SSS_T$. For this, generally the value of the variable resistor is adjusted so as to adjust phase and amplitude of the voltage between terminals of the ignition semiconductor element $SSS_T$. In the circuit of FIG. 3 which applies voltage to phase adjusting circuit 13 from outside in addition to the above system, the waveshape of said voltage is weighted and changed by adjusting the amount of feed of voltage so as to change voltage and phase between terminals of ignition semiconductor element $SSS_T$ as well as amplitude of phase, resulting to change ignition phase of ignition semiconductor element.

Generally current of the motor increases and decreases almost proportionally to load. Accordingly the circuit of FIG. 3 conducts the current of the motor to the primary side of transformer F.T. as means for detecting fluctuation of load and takes out the change of current of motor on secondary side of transformer F.T. as change of voltage. This varying voltage is used by this circuit as outside source for supplying voltage to said phase adjusting circuit 13. Namely in order to supply voltage of secondary side of transformer F.T. to phase adjusting circuit 13, said circuit must be connected in such polarity as increasing terminal voltage of motor, when load is weighted. In concretely designing transformer F.T. to be used to such a circuit, it is required to form impedance of primary side as small as possible and impedance of secondary side larger than reactance of condenser $C_1$, and the winding ratio must be so selected as to obtain an appropriate feedback amount. Further although, in FIG. 3, the terminal of the secondary side of transformer F.T. is connected to condenser $C_1$ in parallel, the object of the present invention can also be achieved almost appropriately by connecting the secondary terminal to condenser $C_1$ in series or connecting this terminal to resistance R and condenser $C_1$ in parallel, if the polarity and the circuit constant are appropriately selected.

For controlling the speed of the motor by the above circuit, variable resistor V.R. is adjusted so as to adjust continuity phase of the main circuit semiconductor element $SSS_M$. Thus the speed of the motor is set to a fixed speed. It is evident that in this setting transformer F.T. has actioned to the continuity phase of main circuit semiconductor element $SSS_M$. Accordingly if the value of variable resistor V.R. is kept as it is, moreover without fluctuation of the load of motor or others, the continuity phase of the main circuit semiconductor element $SSS_M$ is constant at all times. However if the load changes even slightly, this circuit immediately acts to inhibit the change of speed of motor caused by the fluctuation of the load.

Figure 4:
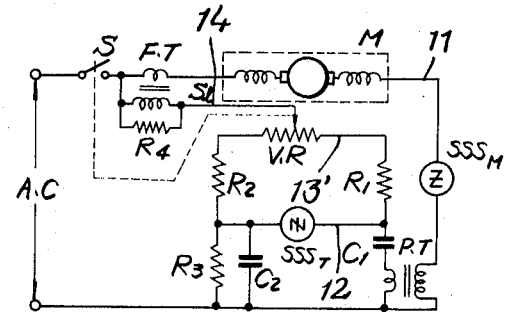

FIG. 4 shows a circuit which connects the secondary coil of transformer F.T. in series to sliding terminal line S1 of phase adjusting variable resistor V.R. of Toulon phase adjusting circuit 13' consisting of variable resistor V.R. three resistor $R_1$, $R_2$, $R_3$ and condenser $C_1$, connects said secondary coil to feedback signal circuit 14' and connects one of said secondary coils to one power source line in consideration of polarity. In the figure $R_4$ denotes a feedback amount adjusting resistor. In such a circuit voltage is generated in response to fluctuation of load on secondary side of transformer F.T. similarly to the aforementioned. Since the voltage generated changes the voltage of the circuit, phase and voltage of terminal voltage of $SSS_T$ can be thereby adjusted.

Figure 5:
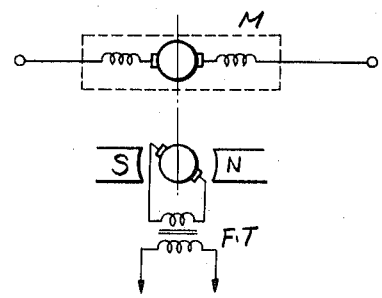
FIG. 5 is a circuit diagram of an embodiment of an automatic speed adjusting portion utilizing the change of speed electromotive force instead of the above current.

Some performances of automatic adjustment of voltage relative to load, achieved by adoption of the above explained circuit of FIG. 3 and FIG. 4 are as follows. For instance in case that the terminal voltage is controlled to about 40 v. by a control circuit comprising a single-phase series commutator motor of output of about 30 v. connected with an alternate current power source of 100 v. and said motor is driven in no-load, terminal voltage can be raised near 40 v, if the motor is bound. This effect can be also achieved by connecting the primary coil of transformer F.T. for detecting load fluctuation of the above embodiment of FIG. 3 and FIG. 4. While the above embodiment utilizes current of motor for detecting fluctuation of load, the present invention further permits to convert rotary movement of motor or other load to speed electromotive force as shown in FIG. 5 and utilize the change of speed electromotive force so as to apply feedback signal voltage to phase adjusting circuit similarly to the above mentioned.

As above explained the present invention provide a circuit conducting the adjustment of phase by supplying voltage from outside to a phase adjusting circuit of a speed control circuit using a symmetrical semiconductor element and moreover performing its proper speed control by a variable resistor V.R. as before.

Further since the present application uses a transformer F.T. as above stated, the fluctuation of load can be converted into signal voltage so that even when a considerable load is applied to a motor driven by a low terminal voltage, this voltage can be made a nearly full terminal voltage automatically, and the characteristics hitherto inaccessible for this kind of control circuit can be easily obtained. The application of the present device to sewing machine and other motor enables these machines to perform with good result. Therefore this device is a creation with an industrially noticeable effect.

We claim:

1. A speed control circuit for an electric motor comprising a source of electrical current, a main circuit having a motor, a symmetrical semiconductor switching element and a secondary winding of a pulse transformer, connected in series, a phase adjusting circuit composed of a feedback transformer, variable resistor, a plurality of fixed resistors and a plurality of condensers, and a trigger circuit having a triggerable symmetrical semiconductor switching element and a primary winding of said pulse transformer, and said primary winding of said feedback transformer being connected between said motor and said source of current whereby the motor current flowing through the semiconductor switching element of said main circuit flows through said primary winding, and said secondary winding of said feedback transformer being connected between said variable resistor and said source of current, so as to give voltage induced on said secondary winding a reversed polarity to the polarity of the voltage impressed on said phase adjusting circuit from said source of current.

2. A speed control circuit for an electric motor as described in claim 1, wherein said phase adjusting circuit is respectively connected in series with a plurality of resistors on one side of said variable resistor, fixed resistor and one of said condensers on the other side of said variable resistor and these series circuits are connected in parallel, and said phase adjusting circuit is provided in parallel, and said phase adjusting circuit is provided in parallel with said motor of said main circuit and the symmetrical semiconductor element so that a wiper of said variable resistor is connected in series with the secondary winding of said feedback transformer so as to form a path for the feedback signal.

3. A speed control circuit for an electric motor comprising a source of electrical current, a main circuit having a motor, a symmetrical semiconductor switching element and a secondary winding of a pulse transformer, connected in series, a phase adjusting circuit having a feedback transformer, variable resistor provided in parallel with said main circuit, a fixed resistor and a plurality of condensers, a trigger circuit having a triggerable symmetrical semiconductor switching element and the primary winding of said pulse transformer, and, the primary winding of said feedback transformer being connected between said motor and said source of current, and the secondary winding of said feedback transformer being connected to terminals of said condensers for rendering the voltage induced on said secondary winding a reversed polarity to the polarity of the voltage impressed on said phase adjusting circuit from said source of current.